US011249989B2

(12) United States Patent
Seiden et al.

(10) Patent No.: US 11,249,989 B2
(45) Date of Patent: *Feb. 15, 2022

(54) GENERATING A DATABASE QUERY TO DYNAMICALLY AGGREGATE ROWS OF A DATA SET

(71) Applicant: SIGMA COMPUTING, INC., San Francisco, CA (US)

(72) Inventors: Max H. Seiden, San Francisco, CA (US); Jason D. Frantz, San Francisco, CA (US); James L. Gale, San Francisco, CA (US); Robert C. Woollen, San Rafael, CA (US)

(73) Assignee: SIGMA COMPUTING, INC., San Francisco, CA (US)

( * ) Notice: Subject to any disclaimer, the term of this patent is extended or adjusted under 35 U.S.C. 154(b) by 36 days.

This patent is subject to a terminal disclaimer.

(21) Appl. No.: 16/919,458

(22) Filed: Jul. 2, 2020

(65) Prior Publication Data

US 2020/0334243 A1 Oct. 22, 2020

Related U.S. Application Data

(63) Continuation of application No. 16/133,888, filed on Sep. 18, 2018, now Pat. No. 10,810,192.

(51) Int. Cl.
*G06F 16/242* (2019.01)
*G06F 16/22* (2019.01)
(Continued)

(52) U.S. Cl.
CPC ...... *G06F 16/2423* (2019.01); *G06F 16/2246* (2019.01); *G06F 16/248* (2019.01); *G06F 16/24556* (2019.01); *G06F 40/18* (2020.01)

(58) Field of Classification Search
CPC .......... G06F 16/2423; G06F 16/2246; G06F 16/24556; G06F 16/248; G06F 40/18
(Continued)

(56) References Cited

U.S. PATENT DOCUMENTS 4,989,141 A * 1/1991 Lyons ............... G06Q 40/06
705/36 R
5,713,020 A 1/1998 Reiter et al.
(Continued)

FOREIGN PATENT DOCUMENTS

EP 1610231 A3 2/2008

OTHER PUBLICATIONS

International Search Report and Written Opinion, PCT/US2019/051596, dated Nov. 5, 2019, 13 pages.
(Continued)

*Primary Examiner* — Dung K Chau

(57) ABSTRACT

Generating a database query to dynamically aggregate rows of a data set including determining a hierarchical relationship between a first column and a second column within a spreadsheet structure, wherein the first column and the second column comprise rows of the data set; receiving a calculation for a third column within the spreadsheet structure; determining that the third column is on a same hierarchical level as the first column; and in response to determining that the third column is on the same hierarchical level as the first column, generating the database query aggregating a plurality of rows of the data set based on the calculation for the third column and the hierarchical relationship between the first column and the second column.

20 Claims, 8 Drawing Sheets

(51) Int. Cl.
*G06F 16/2455* (2019.01)
*G06F 16/248* (2019.01)
*G06F 40/18* (2020.01)

(58) Field of Classification Search
USPC .......................................................... 707/722
See application file for complete search history.

(56) References Cited

U.S. PATENT DOCUMENTS

| | | | |
|---|---|---|---|
| 6,611,840 B1* | 8/2003 | Baer | G06F 16/958 715/270 |
| 2006/0195424 A1 | 8/2006 | Wiest et al. | |
| 2009/0157711 A1* | 6/2009 | Baer | G06F 16/252 |
| 2015/0006470 A1* | 1/2015 | Mohan | G06F 16/283 707/603 |
| 2015/0066930 A1* | 3/2015 | Tibrewal | G06F 3/0485 707/737 |
| 2015/0261728 A1* | 9/2015 | Davis | G06F 40/143 715/234 |
| 2015/0261729 A1* | 9/2015 | Davis | G06F 40/151 715/234 |
| 2016/0217401 A1* | 7/2016 | Leung | G06Q 10/06311 |
| 2017/0052766 A1* | 2/2017 | Garipov | G06F 16/2291 |

OTHER PUBLICATIONS

Keith Fink, Overview of PivotTables and PivotCharts in Microsoft Access 2002, Microsoft Support WebCast, XP0022772525, URL: https://support.microsoft.com/default.aspx?scid=/servicedesk/webcasts/wc081601/wvblurb081601.asp, dated Aug. 16, 2001, 44 pages.

Sal Hasi, Drag Drop Grouping Flex DataGrid, YouTube, URL: https://www.youtube.com/watch?v=soWMKzt19VM, dated Jan. 26, 2015, 1 page.

Wikipedia, Pivot Table, URL: https://en.wikipedia.org/w/index.php?title=Pivot_table&oldid=857163289, dated Aug. 29, 2018, printed Oct. 23, 2019, 6 pages.

Wikipedia, SQL window function, URL: https://en.wikipedia.org/w/index.php?title—SQL_window_function&oldid=844520607, dated Jun. 5, 2018, printed Oct. 24, 2019, 2 pages.

* cited by examiner

GENERATING A DATABASE QUERY TO DYNAMICALLY AGGREGATE ROWS OF A DATA SET

CROSS-REFERENCE TO RELATED APPLICATION

This application is a continuation application of and claims priority from U.S. patent application Ser. No. 16/133,888, filed Sep. 18, 2018.

BACKGROUND

Field of the Invention

The field of the invention is data processing, or, more specifically, methods, apparatus, and products for generating a database query to dynamically aggregate rows of a data set.

Description of Related Art

Modern businesses may store large amounts of data in remote databases within cloud-based data warehouses. This data may be accessed using database query languages, such as structured query language (SQL). However, different presentations and configurations of the data may require constructing complex queries, which may be difficult for most users.

SUMMARY

Methods, systems, and apparatus for generating a database query to dynamically aggregate rows of a data set are disclosed in this specification. Generating a database query to dynamically aggregate rows of a data set includes determining a hierarchical relationship between a first column and a second column within a spreadsheet structure, wherein the first column and the second column comprise rows of the data set; receiving a calculation for a third column within the spreadsheet structure; determining that the third column is on a same hierarchical level as the first column; and in response to determining that the third column is on the same hierarchical level as the first column, generating the database query aggregating a plurality of rows of the data set based on the calculation for the third column and the hierarchical relationship between the first column and the second column.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
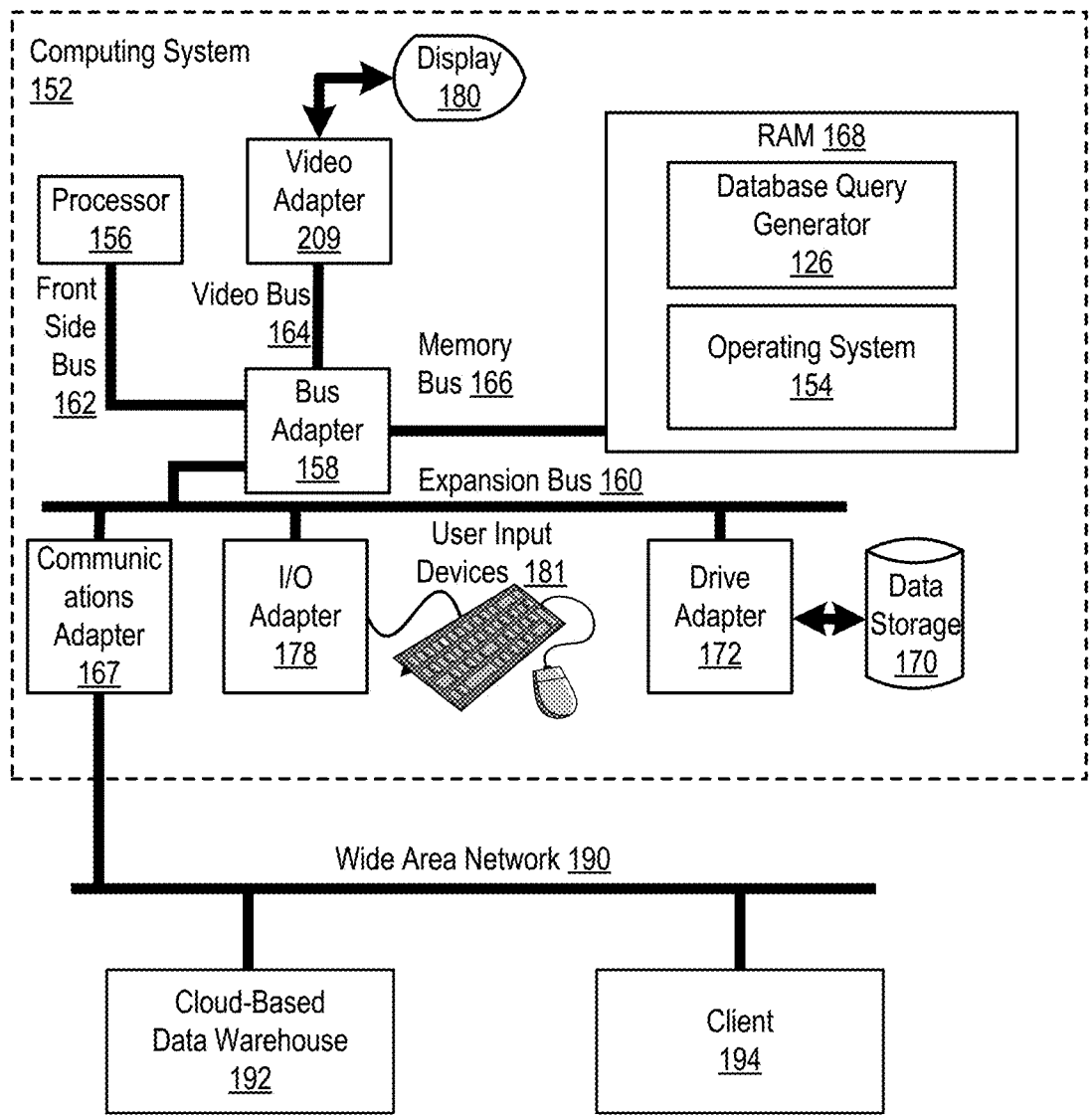
FIG. 1 sets forth a block diagram of an example system configured for generating a database query to dynamically aggregate rows of a data set according to embodiments of the present invention.

Exemplary methods, apparatus, and products for generating a database query to dynamically aggregate rows of a data set in accordance with the present invention are described with reference to the accompanying drawings, beginning with FIG. 1. FIG. 1 sets forth a block diagram of automated computing machinery comprising an exemplary computing system (152) configured for generating a database query to dynamically aggregate rows of a data set according to embodiments of the present invention. The computing system (152) of FIG. 1 includes at least one computer processor (156) or 'CPU' as well as random access memory (168) ('RAM') which is connected through a high speed memory bus (166) and bus adapter (158) to processor (156) and to other components of the computing system (152).

Stored in RAM (168) is an operating system (154). Operating systems useful in computers configured for generating a database query to dynamically aggregate rows of a data set according to embodiments of the present invention include UNIX™, Linux™, Microsoft Windows™, AIX™, IBM's i OS™, and others as will occur to those of skill in the art. The operating system (154) in the example of FIG. 1 is shown in RAM (168), but many components of such software typically are stored in non-volatile memory also, such as, for example, on data storage (170), such as a disk drive. Also stored in RAM is the database query generator (126), a module for generating a database query to dynamically aggregate rows of a data set according to embodiments of the present invention.

The computing system (152) of FIG. 1 includes disk drive adapter (172) coupled through expansion bus (160) and bus adapter (158) to processor (156) and other components of the computing system (152). Disk drive adapter (172) connects non-volatile data storage to the computing system (152) in the form of data storage (170). Disk drive adapters useful in computers configured for generating a database query to dynamically aggregate rows of a data set according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computing system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computing system (152) of FIG. 1 includes a communications adapter (167) for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for generating a database query to dynamically aggregate rows of a data set according to embodiments of the present invention include modems for wired dial-up communications, Ethernet (IEEE 802.3) adapters for wired data communications, and 802.11 adapters for wireless data communications.

The communications adapter (167) is communicatively coupled to a wide area network (190) that also includes a cloud-based data warehouse (192) and a client system (194). The cloud-based data warehouse (192) is a computing system or group of computing systems that hosts a database for access over the wide area network (190). The client system (194) is a computing system that accesses the database using the database query generator (126) on the computing system (152).

Figure 2:
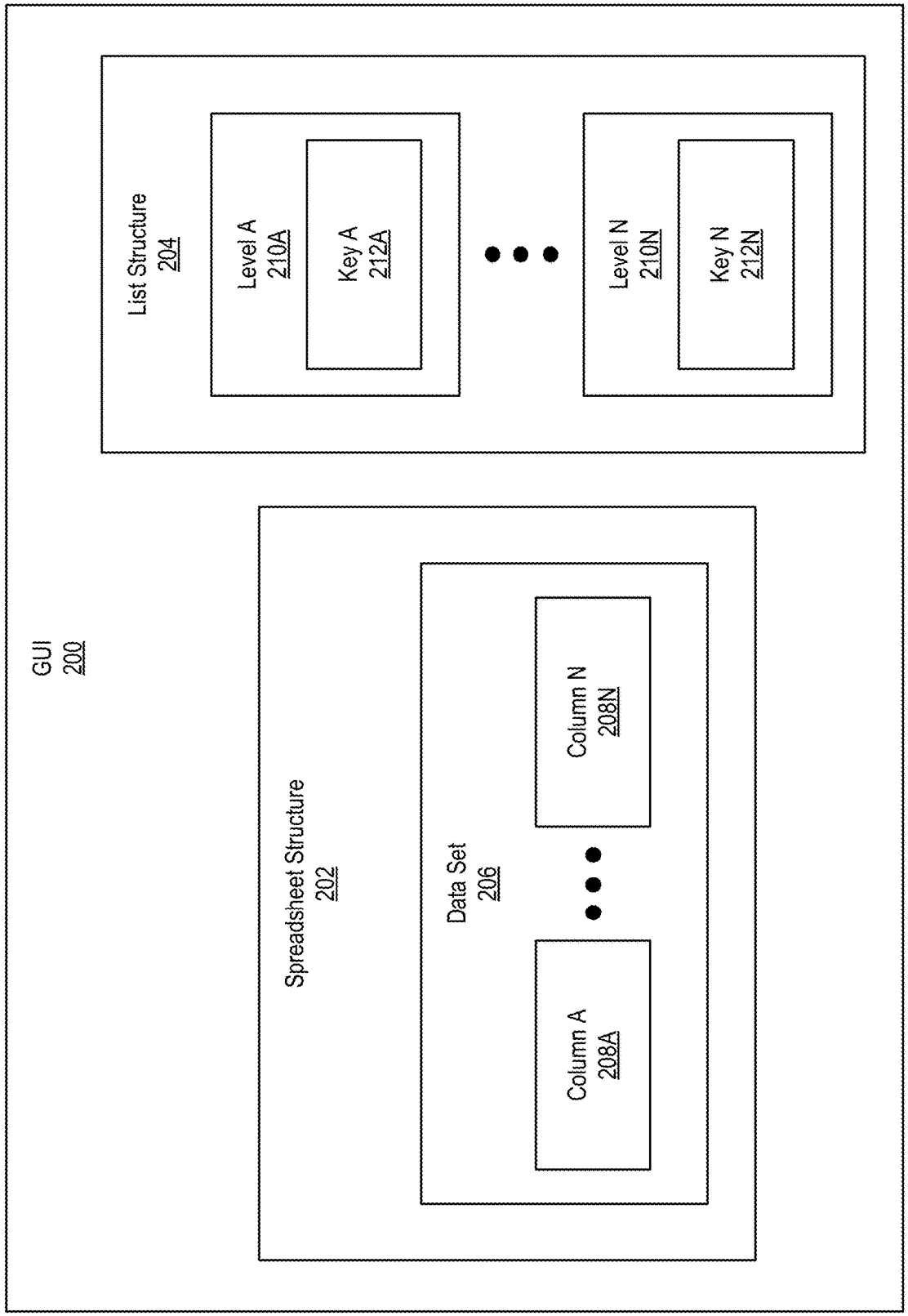
FIG. 2 sets forth a block diagram of an example system configured for generating a database query to dynamically aggregate rows of a data set according to embodiments of the present invention.

FIG. 2 shows an exemplary graphical user interface (GUI) for generating a database query using a dimensional hierarchy according to embodiments of the present invention. As shown in FIG. 2, the exemplary GUI (200) includes a spreadsheet structure (202) and a list structure (204). The spreadsheet structure (202) includes a data set (206) with multiple columns (column A (208A), column N (208N)). The list structure (204) includes multiple levels (level A (210A), level N (210N)). Each level may include zero, one, or more than one key (key A (212A), key N (212N)).

The GUI (200) is a user interface that presents graphical elements to a user and receives user input from the user. The GUI (200) may be presented by a database query generator and displayed on a client system (e.g., on a system display or mobile touchscreen). The GUI (200) may be an Internet application hosted on a server system communicatively coupled to both the client system and a cloud-based data warehouse.

The spreadsheet structure (202) is a graphical element and organizing mechanism for the data set (206). The spreadsheet structure (202) displays the data within the data set (206) as rows of data organized by columns (column A (208A), column N (208N)). The columns (column A (208A), column N (208N)) delineate different categories of the data in each row of the data set (206). The columns (column A (208A), column N (208N)) may also be calculations using other columns (column A (208A), column N (208N)) in the data set (206).

The data set (206) is a collection of data from a cloud-based data warehouse presented in the spreadsheet structure (202). The data set (206) may be a result of a database query sent by the database query generator to a database in the cloud-based data warehouse. The data set (206) may be received by the database query generator and configured for presentation in the spreadsheet structure (202).

The list structure (204) is a graphical element used to define and organize the hierarchical relationships between the columns (column A (208A), column N (208N)) of the data set (206). The term "hierarchical relationship" refers to subordinate and superior groupings of columns (column A (208A), column N (208N)). For example, a database may include rows for an address book, and columns for state, county, city, and street. A data set from the database may be grouped first by state, then by county, and then by city. Accordingly, the state column would be at the highest level in the hierarchical relationship, the county column would be in the second level in the hierarchical relationship, and the city column would be at the lowest level in the hierarchical relationship.

The list structure (204) presents a dimensional hierarchy to the user. Specifically, the list structure (204) presents levels arranged hierarchically across at least one dimension. Each level (level A (210A), level N (210N)) within the list structure (204) is a position within a hierarchical relationship between columns (column A (208A), column N (208N)) selected as keys (key A (212A), key N (212N)). The keys (key A (212A), key N (212N)) identify the one or more columns (column A (208A), column N (208N)) that are the participants in the hierarchical relationship. Each level (level A (210A), level N (210N)) may have more than one key.

One of the levels (level A (210A), level N (210N)) in the list structure (204) may be a base level. Columns selected for the base level provide data at the finest granularity. One of the levels (level A (210A), level N (210N)) in the list structure (204) may be a totals or root level. Columns selected for the totals level provide data at the highest granular level. For example, the totals level may include a field that calculates the sum of each row within a single column of the entire data set (i.e., not partitioned by any other column).

The GUI (200) may be managed by a database query generator. The database query generator is hardware, software, or an aggregation of hardware and software configured to determine the selection of columns as keys in the list structure (204) and generate a database query based on the order of the keys.

The GUI (200) may enable a user to drag and drop columns (column A (208A), column N (208N)) into the list structure (204). The order of the list structure (204) may specify the hierarchy of the columns (column A (208A), column N (208N)) relative to one another. A user may be able to drag and drop the columns (column A (208A), column N (208N)) in the list structure at any time to redefine the hierarchical relationship between columns. The hierarchical relationship defined using the columns (column A (208A), column N (208N)) selected as keys (key A (212A), key N (212N)) in the list structure (204) may be utilized in charts such that drilling down (e.g., double click on a bar), enables a new chart to be generated based on a level lower in the hierarchy.

Figure 3:
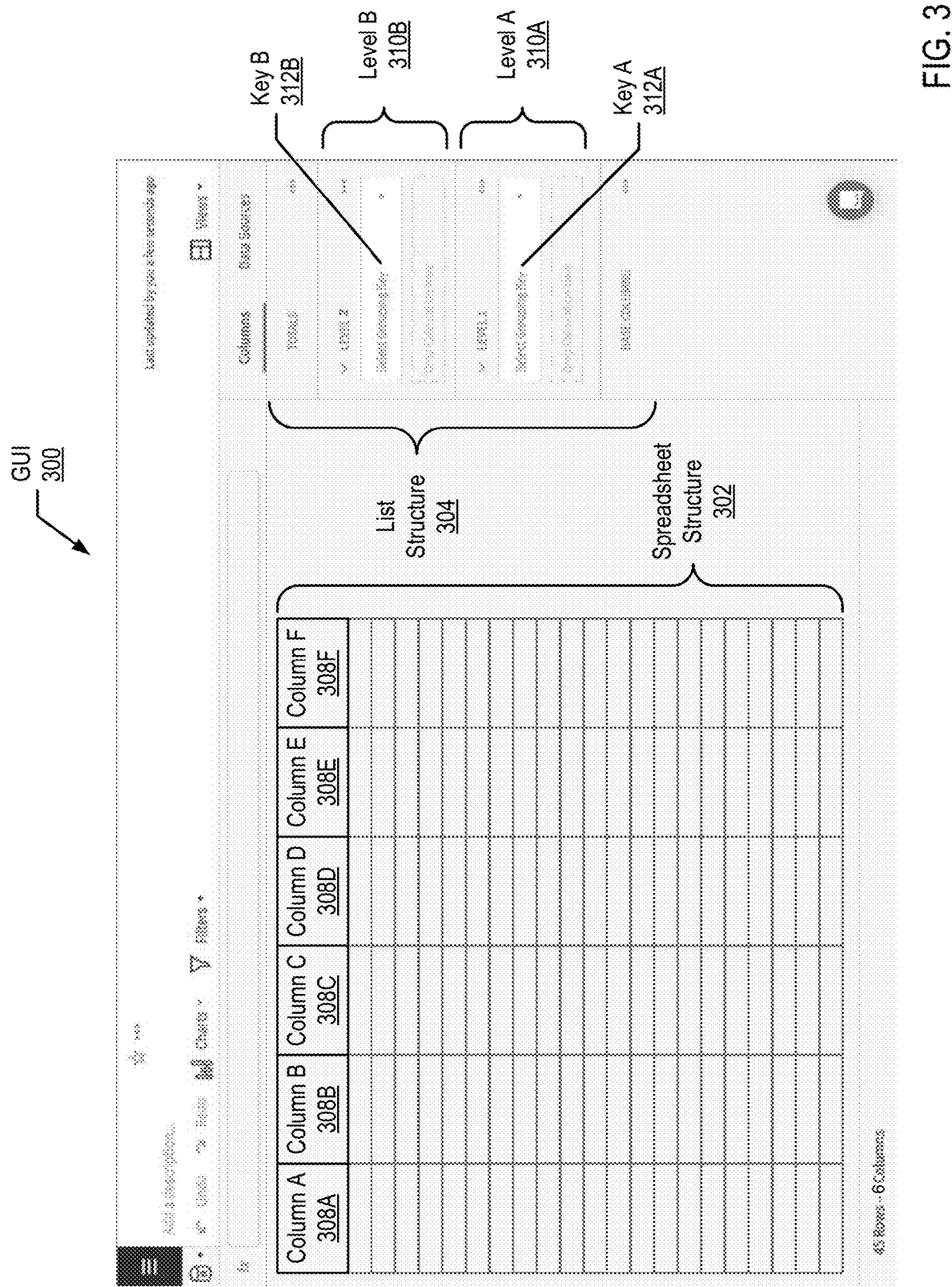
FIG. 3 sets forth a block diagram of an example system configured for generating a database query to dynamically aggregate rows of a data set according to embodiments of the present invention.

FIG. 3 shows an exemplary implementation of a GUI for generating a database query using a dimensional hierarchy according to embodiments of the present invention. As shown in FIG. 3, the exemplary implementation of the GUI (300) includes a spreadsheet structure (302) and a list structure (304). The spreadsheet structure (302) includes a data set (shown as empty rows) with six columns (column A (308A), column B (308B), column C (308C), column D (308D), column E (308E), column F (308F)). The list structure (304) includes two levels (level A (310A), level B (310B)). Level A (310A) includes key A (312A), and level B (310B) includes key B (312B)). The list structure (304) also includes a base level and a totals level.

Figure 4:
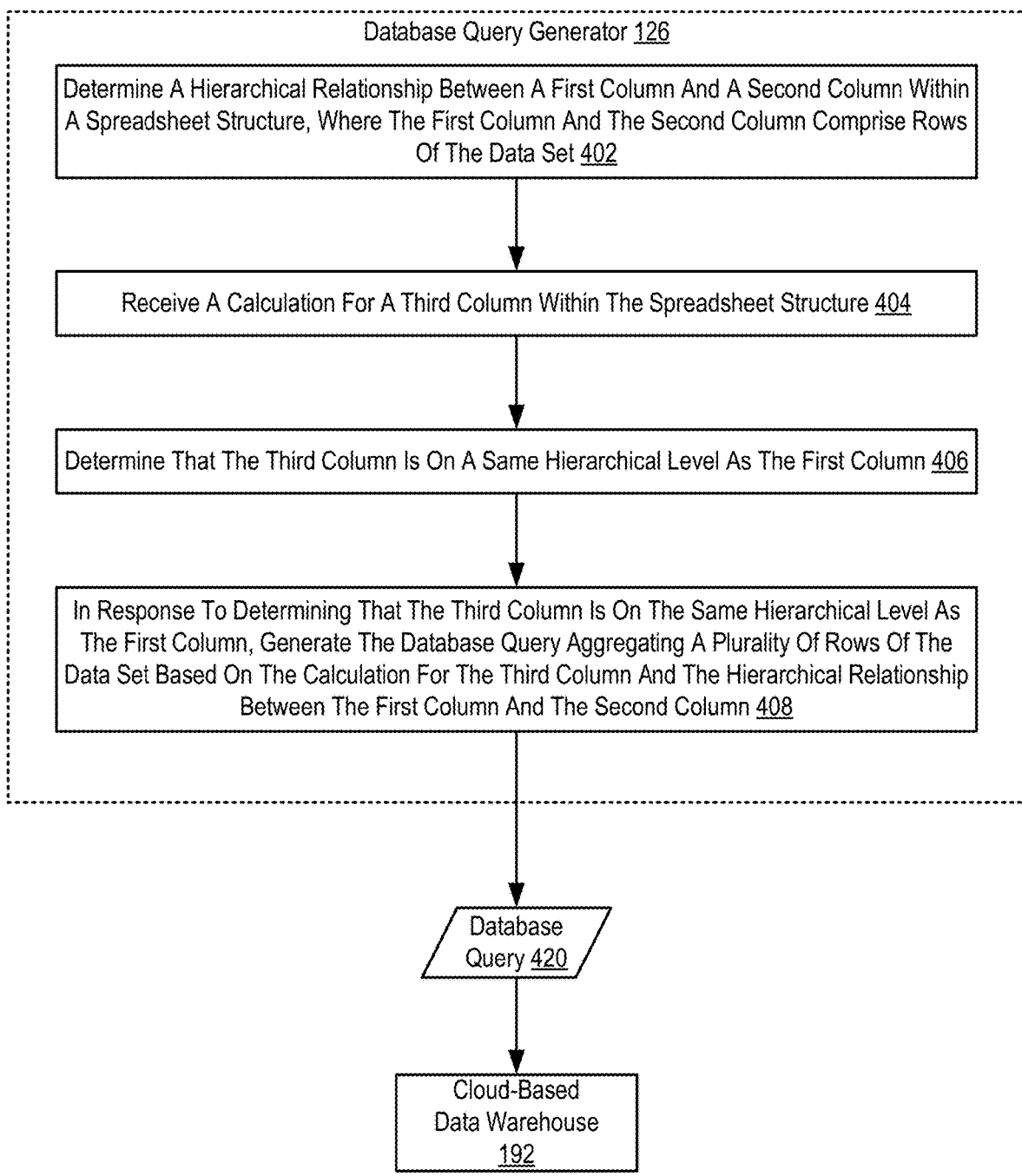
FIG. 4 sets forth a flow chart illustrating an exemplary method for generating a database query to dynamically aggregate rows of a data set according to embodiments of the present invention.

For further explanation, FIG. 4 sets forth a flow chart illustrating an exemplary method for generating a database query to dynamically aggregate rows of a data set according to embodiments of the present invention that includes determining (402) a hierarchical relationship between a first column and a second column within a spreadsheet structure, wherein the first column and the second column comprise rows of the data set. Determining (402) a hierarchical relationship between a first column and a second column within a spreadsheet structure, wherein the first column and the second column comprise rows of the data set may be carried out by the database query generator (126) receiving an indication that the first column has been selected for a first level within a list structure and that the second column has been selected for a second level within the list structure. The database query generator (126) may then determine the hierarchical relationship by determining the order of the first level and the second level (i.e., which is subordinate and which is superior) in the list structure. The first column and second column may be selected as keys for each respective level. Further, either the first level or second level may be a base level or totals level.

For example, the cloud-based data warehouse (192) may include a database of hotels. As shown in the example data set of Table 1, the data set may include the city, street, and number of rooms for hotels in downtown Austin, Houston, and Dallas.

TABLE 1

| City | Street Name | Hotel Name | Number of Rooms |
|---|---|---|---|
| Houston | Texas Ave. | Magnolia | 54 |
| Austin | San Jacinto St. | Omni | 65 |
| Houston | Texas Ave. | Lancaster | 62 |
| Dallas | Pacific Ave. | Hilton | 68 |
| Austin | Brazos St. | Driskill | 58 |
| Austin | San Jacinto St. | Hampton Inn | 49 |
| Dallas | Commerce St. | Magnolia | 35 |
| Houston | Crawford St. | Hampton Inn | 72 |
| Dallas | Main St. | Westin | 51 |
| Dallas | Commerce St. | Hampton Inn | 60 |
| Houston | Texas Ave. | Westin | 44 |
| Austin | Brazos St. | Firehouse Hostel | 18 |

Using the example in Table 1, the first column may be the City column, and the second column may be the Street Name column. The City column may be selected as a key to a first level, the Street Name column may be selected as a key to a second level, and the first level may be hierarchically above the second level. Therefore, in this example, determining a hierarchical relationship between a first column and a second column within a spreadsheet structure would include determining that the first column is at a higher hierarchical level than the second column.

The hierarchical relationship between the first column and the second column may create an implicit windowing. An implicit windowing is a partition of the rows of each column subordinate to the superior key column. For example, if the City column is the key to the highest level, each subordinate column is partitioned by city.

The method of FIG. 4 further includes receiving (404) a calculation for a third column within the spreadsheet structure. Receiving (404) a calculation for a third column within the spreadsheet structure may be carried out by the database query generator (126) receiving a formula that aggregates a plurality of rows of the data set. The plurality of rows of the data set may be within another column of the data set, and may or may not be the first or second column used in the determination of the hierarchical relationship. Using the example of Table 1, a third column may be a sum of the rows in the Number of Rooms column.

The calculation may be an aggregation function. An aggregation function is a function that uses data from multiple rows of one or more columns to obtain a result presented in a single row. The aggregation function may reduce many rows in one or more columns to a single row of a different or same column. Examples of aggregation functions include sum functions, average functions, and cumulative functions.

The method of FIG. 4 further includes determining (406) that the third column is on a same hierarchical level as the first column. Determining (406) that the third column is on a same hierarchical level as the first column may be carried out by the database query generator (126) receiving an indication that the third column is bound to the key of the same level as the first column within the list structure. The first column may be the key for the level, and the third column may be bound to the first column. For example, the third column may be created with a formula, then a user may drag and drop the third column into the first level just below the key (e.g., the first column) for the first level (but not selected as a key for the first level). This may generate an indication to the database query generator (126) that the third column is on the first level, which is the same hierarchical level as the first column.

A user may bind a column to a key in a level by dragging and dropping the column in the level and adjacent to the key. Alternatively, a user may bind a column to a key in a level by selecting the column and using a menu to bind the column to a particular key in a particular level. Binding the third column to a key in a level applies the calculation to the entire column group instead of each data row. For example, a third column that calculates the number or rows would show a '1' for each row if the third column were a base column. However, if the third column were bound to the city column of Table 1, the third column would show a '4' for Austin, a '4' for Dallas, and a '4' for Houston.

The method of FIG. 4 further includes, in response to determining that the third column is on the same hierarchical level as the first column, generating (406) the database query (420) aggregating a plurality of rows of the data set based on the calculation for the third column and the hierarchical relationship between the first column and the second column. Generating (406) the database query (420) aggregating a plurality of rows of the data set based on the calculation for the third column and the hierarchical relationship between the first column and the second column may be carried out by the database query generator (126) using the order of the first key and the second key in the list structure, the hierarchical location of the third column in the list structure, and the calculation for the third column to select a database query statement and populate the statement with parameters. The database query may be auto-populated in response to various selections by the user, including the selection of the first column and the second column. Other user selections may include filters and column sorting. Once the database query is generated, the database query generator (126) may send the database query over a wide area network to the cloud-based data warehouse (192).

The database query aggregating a plurality of rows of the data set may include a structure query language (SQL) statement. Such an SQL statement may include a group by statement or aggregation function. The statement or statements may be auto-populated with references to the first column and column or columns containing the plurality of rows to be aggregated. Multiple statements may be nested within one another.

A block of database statements may be generated for each selection made by a user. After each selection is made, the blocks of database statements may be combined to generate the database query. For example, the creation of the hierarchical relationship between the first column and the second may result in the generation of a first block of database statements, the association of the third column with the first level may result in the generation of a second block of database statements, and a selected filter may result in the generation of a third block of database statements. After the last selection is made, the three blocks of database statements may be combined into a single database query.

The above limitations improve the operation of the computer system by generating complex database queries based on user-friendly selections of data categories. The above limitations describe a specific, structured graphical user interface paired with a prescribed functionality directly related to the graphical user interface's structure that is addressed to and resolves a specifically identified problem in the prior state of the art. Specifically, the hierarchical relationship between two columns in the interface and the relationship of a third column to the first column is used to generate a database query that may be too complex or difficult for most users to write themselves.

Figure 5:
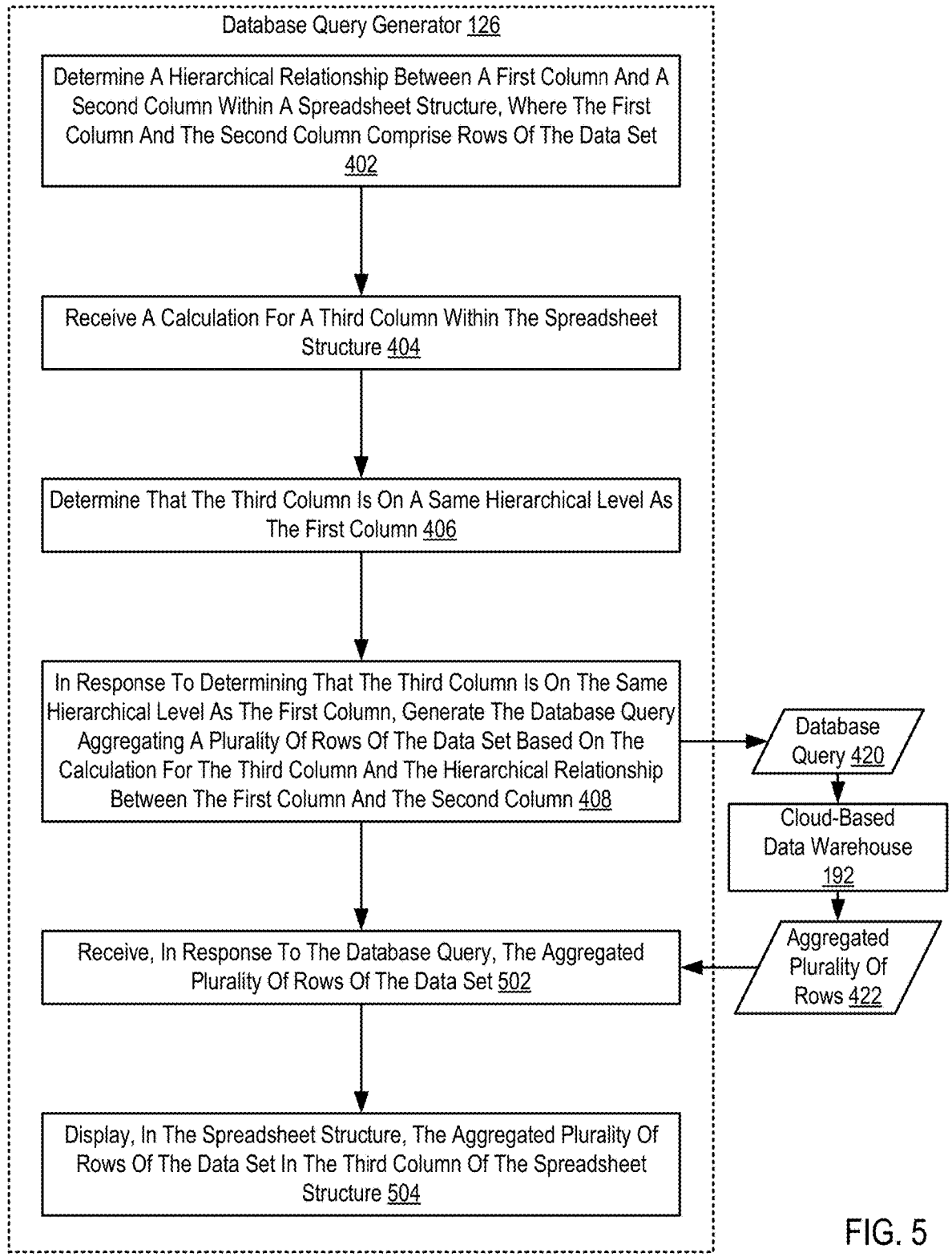
FIG. 5 sets forth a flow chart illustrating an exemplary method for generating a database query to dynamically aggregate rows of a data set according to embodiments of the present invention.

For further explanation, FIG. 5 sets forth a flow chart illustrating a further exemplary method for generating a database query to dynamically aggregate rows of a data set according to embodiments of the present invention that includes determining (402) a hierarchical relationship between a first column and a second column within a spreadsheet structure, wherein the first column and the second column comprise rows of the data set; receiving (404) a calculation for a third column within the spreadsheet structure; determining (406) that the third column is on a same hierarchical level as the first column; and in response to determining that the third column is on the same hierarchical level as the first column, generating (406) the database query (420) aggregating a plurality of rows of the data set based on the calculation for the third column and the hierarchical relationship between the first column and the second column.

The method of FIG. 5 differs from the method of FIG. 4, however, in that the method of FIG. 5 further includes receiving (502), in response to the database query, the aggregated plurality of rows (422) of the data set; and displaying (504), in the spreadsheet structure, the aggregated plurality of rows (422) of the data set in the third column of the spreadsheet structure.

Receiving (502), in response to the database query, the aggregated plurality of rows (422) of the data set may be carried out by the database query generator (126) receiving the aggregated plurality of rows (422) of the data set from the cloud-based data warehouse (192) in response to the database query (420).

Displaying (504), in the spreadsheet structure, the aggregated plurality of rows (422) of the data set in the third column of the spreadsheet structure may be carried out by the database query generator (126) inserting the third column displaying the aggregated plurality of rows (422) in the spreadsheet structure. The third column may be inserted among a group of columns within the same level as the first column.

Continuing with the example of Table 1, assume that the first column is the City column and the second column is the Street Name column. Assume further that the City column is on a higher hierarchical level than the Street Name column because the City column is selected as the key of the first (top) level of the list structure. Assume also that the Street Name column is on a lower hierarchical level than the City column because the Street Name column is selected as the key of the second (bottom) level of the list structure. Assume then that a third column is created as a Hotel Room Sum column that calculates the sum of hotel rooms and is placed within the same first level as the City column. A database query is then generated that groups the data rows first by city then by street name. A database query also requests the sum of the hotel rooms at the City column level for the third column. The database query is sent to the cloud-based data warehouse (192), and in response, the database query generator (126) receives the aggregated plurality of rows (422) of data set as shown in Table 2.

TABLE 2

| City | Hotel Room Sum | Street Name | Hotel Name | Number of Rooms |
|---|---|---|---|---|
| Austin | 190 | Brazos St. | Driskill | 58 |
| | | | Firehouse Hostel | 18 |
| | | San Jacinto St. | Omni | 65 |
| | | | Hampton Inn | 49 |
| Dallas | 214 | Commerce St. | Magnolia | 35 |
| | | | Hampton Inn | 60 |
| | | Main St. | Westin | 51 |
| | | Pacific Ave. | Hilton | 68 |
| Houston | 232 | Crawford St. | Hampton Inn | 72 |
| | | Texas Ave. | Westin | 44 |
| | | | Magnolia | 54 |
| | | | Lancaster | 62 |

As shown in Table 2, the third column (Hotel Room Sum) shows an aggregation of the rows in the Number of Rooms column at the City column level. Note that the received calculation for the third column may only reference the Number of Rooms column (the rows to be aggregated), and the association of the third column with the first column (the City column) causes the plurality of rows to be aggregated based on the implicit windowing of the first column (e.g., by city).

Figure 6:
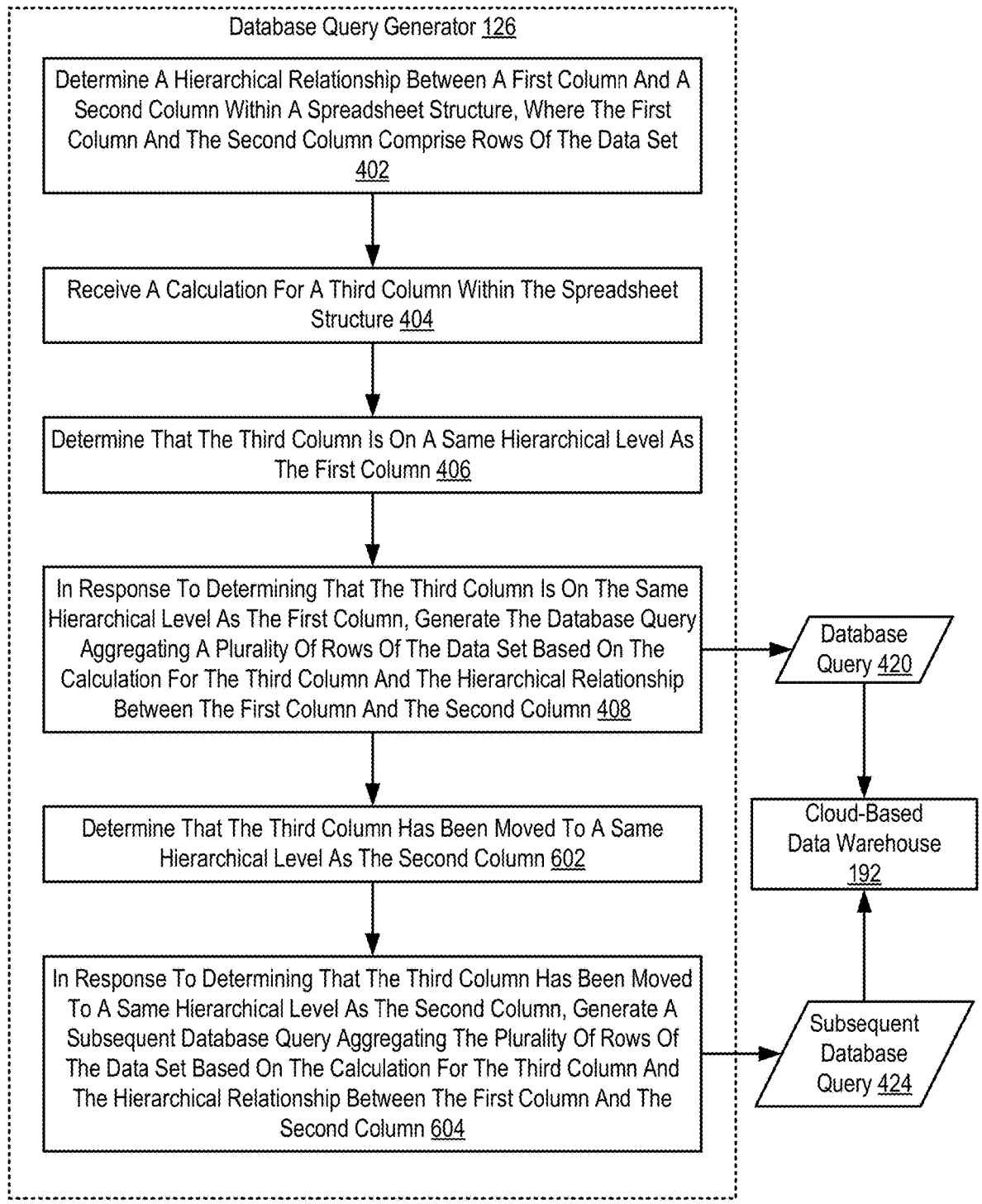
FIG. 6 sets forth a flow chart illustrating an exemplary method for generating a database query to dynamically aggregate rows of a data set according to embodiments of the present invention.

For further explanation, FIG. 6 sets forth a flow chart illustrating a further exemplary method for generating a database query to dynamically aggregate rows of a data set according to embodiments of the present invention that includes determining (402) a hierarchical relationship between a first column and a second column within a spreadsheet structure, wherein the first column and the second column comprise rows of the data set; receiving (404) a calculation for a third column within the spreadsheet structure; determining (406) that the third column is on a same hierarchical level as the first column; and in response to determining that the third column is on the same hierarchical level as the first column, generating (406) the database query (420) aggregating a plurality of rows of the data set based on the calculation for the third column and the hierarchical relationship between the first column and the second column.

The method of FIG. 6 differs from the method of FIG. 4, however, in that the method of FIG. 6 further includes determining (602) that the third column has been moved to a same hierarchical level as the second column; and in response to determining that the third column has been moved to a same hierarchical level as the second column, generating (604) a subsequent database query (424) aggregating the plurality of rows of the data set based on the calculation for the third column and the hierarchical relationship between the first column and the second column.

Determining (602) that the third column has been moved to a same hierarchical level as the second column may be carried out by the database query generator (126) receiving an indication that a user has bound the third column to the key of the same level as the second column (or bound the third column to the second column if the second column is the key). The user may have dragged and dropped the third column into a second level of the list structure, and the database query generator (126) is notified of the action.

Generating (604) a subsequent database query (424) aggregating the plurality of rows of the data set based on the calculation for the third column and the hierarchical relationship between the first column and the second column may be carried out by the database query generator (126) using the order of the first column and the second column in the list structure and the association between the third column and the second column to select a database query statement and populate the statement with parameters based on the order of the first column and the second column in the list structure and the association between the third column and the second column.

The subsequent database query (424) aggregating the plurality of rows of the data set may be a reaggregation of the same plurality of rows of the data set. Specifically, the calculation of the third row may reference the same set of rows of the data set. Also note that the subsequent database query may be regenerated without any alteration to the calculation of the third column.

Once the subsequent database query is generated, the database query generator (126) may send the subsequent database query over a wide area network to the cloud-based data warehouse (192). In response, the database query generator (126) may receive the aggregation of the plurality of rows of the data set and present the subsequently reconfigured data set in the spreadsheet structure of the GUI.

Continuing with the example of Table 2, Table 3 shows the results of the third column (Hotel Room Sum) having been moved from the same level as the City column to the same level as the Street column.

TABLE 3

| City | Street Name | Hotel Room Sum | Hotel Name | Number of Rooms |
|---|---|---|---|---|
| Austin | Brazos St. | 76 | Driskill | 58 |
|  |  |  | Firehouse Hostel | 18 |
|  | San Jacinto St. | 114 | Omni | 65 |
|  |  |  | Hampton Inn | 49 |

TABLE 3-continued

| City | Street Name | Hotel Room Sum | Hotel Name | Number of Rooms |
|---|---|---|---|---|
| Dallas | Commerce St. | 95 | Magnolia | 35 |
|  |  |  | Hampton Inn | 60 |
|  | Main St. | 51 | Westin | 51 |
|  | Pacific Ave. | 68 | Hilton | 68 |
| Houston | Crawford St. | 72 | Hampton Inn | 72 |
|  | Texas Ave. | 160 | Westin | 44 |
|  |  |  | Magnolia | 54 |
|  |  |  | Lancaster | 62 |

As shown in Table 3, the third column (Hotel Room Sum) presents an aggregation of the rows in the Number of Rooms column at the Street Name column level. Note that the received calculation for the third column may only reference the Number of Rooms column (the rows to be aggregated), and the association of the third column with the second column (the Street Name column) causes the plurality of rows to be aggregated based on the implicit windowing of the second column (e.g., by street name).

Figure 7:
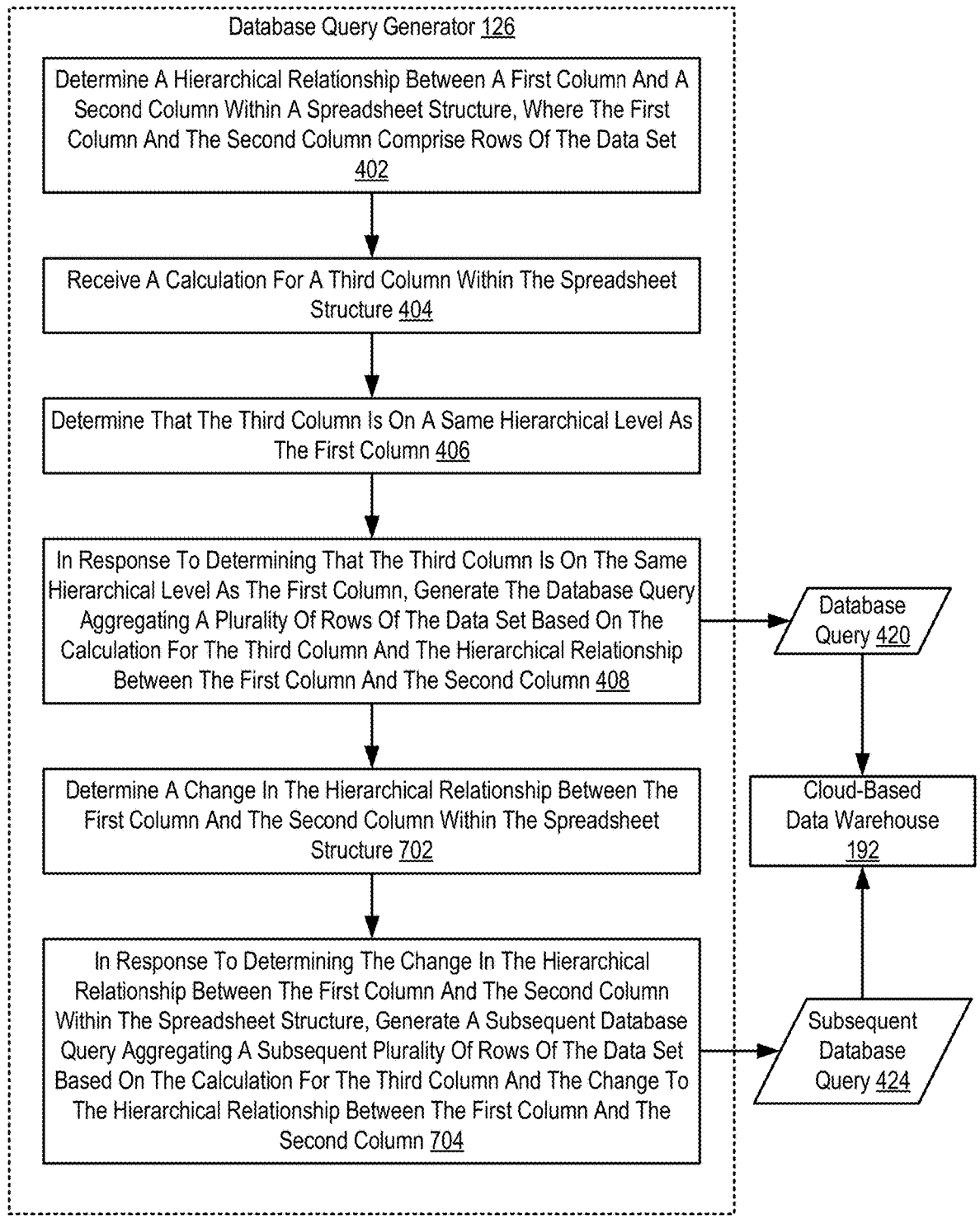
FIG. 7 sets forth a flow chart illustrating an exemplary method for generating a database query to dynamically aggregate rows of a data set according to embodiments of the present invention.

For further explanation, FIG. 7 sets forth a flow chart illustrating a further exemplary method for generating a database query to dynamically aggregate rows of a data set according to embodiments of the present invention that includes determining (402) a hierarchical relationship between a first column and a second column within a spreadsheet structure, wherein the first column and the second column comprise rows of the data set; receiving (404) a calculation for a third column within the spreadsheet structure; determining (406) that the third column is on a same hierarchical level as the first column; and in response to determining that the third column is on the same hierarchical level as the first column, generating (406) the database query (420) aggregating a plurality of rows of the data set based on the calculation for the third column and the hierarchical relationship between the first column and the second column.

The method of FIG. 7 differs from the method of FIG. 4, however, in that the method of FIG. 7 further includes determining (702) a change in the hierarchical relationship between the first column and the second column within the spreadsheet structure; and in response to determining the change in the hierarchical relationship between the first column and the second column within the spreadsheet structure, generating (704) a subsequent database query aggregating the plurality of rows of the data set based on the calculation for the third column and the change to the hierarchical relationship between the first column and the second column.

Determining (702) a change in the hierarchical relationship between the first column and the second column within the spreadsheet structure may be carried out by the database query generator (126) receiving an indication that the order between the level of the first column and the level of the second column has been reversed. For example, the second column may be selected as a key of a first level, and the first column may be selected as a key of a second level below the first level.

Generating (704) a subsequent database query aggregating the plurality of rows of the data set based on the calculation for the third column and the change to the hierarchical relationship between the first column and the second column may be carried out by the database query generator (126) using the order of the first column and the second column in the list structure and the association between the third column and the first column to select a database query statement and populate the statement with parameters based on the order of the first column and the second column in the list structure and the association between the third column and the first column. The database query may be auto-populated in response to various selections by the user.

The subsequent database query (424) aggregating the plurality of rows of the data set may be a reaggregation of the same plurality of rows of the data set. Specifically, the calculation of the third row may reference the same set of rows of the data set. Also note that the subsequent database query may be regenerated without any alteration to the calculation of the third column.

Once the subsequent database query is generated, the database query generator (126) may send the subsequent database query over a wide area network to the cloud-based data warehouse (192). In response, the database query generator (126) may receive the aggregation of the plurality of rows of the data set and present the subsequently reconfigured data set in the spreadsheet structure of the GUI.

For example, Table 4 shows the same data set as Table 1. However, assume that in Table 4 the City column is the first column (and level key) and the Hotel name is the second column (and level key). Initially, the City column is hierarchically above the Hotel Name column. The third column (Hotel Room Sum) is created on the same level as the City column.

TABLE 4

| City | Hotel Room Sum | Hotel Name | Street Name | Number of Rooms |
| --- | --- | --- | --- | --- |
| Austin | 190 | Driskill | Brazos St. | 58 |
|  |  | Firehouse Hostel | Brazos St. | 18 |
|  |  | Hampton Inn | San Jacinto St. | 49 |
|  |  | Omni | San Jacinto St. | 65 |
| Dallas | 214 | Hampton Inn | Commerce St. | 60 |
|  |  | Hilton | Pacific Ave. | 68 |
|  |  | Magnolia | Commerce St. | 35 |
|  |  | Westin | Main St. | 51 |
| Houston | 232 | Hampton Inn | Crawford St. | 72 |
|  |  | Lancaster | Texas Ave. | 62 |
|  |  | Magnolia | Texas Ave. | 54 |
|  |  | Westin | Texas Ave. | 44 |

Assume further that the hierarchical relationship between the City column and the Hotel Name column is changed such that the Hotel Name column is hierarchically above the City column. Table 5 shows the data set received in response to the subsequent database query aggregating the plurality of rows of the data set based on the calculation for the Hotel Room Sum column and the change to the hierarchical relationship between the City column and the Hotel Name column.

TABLE 5

| Hotel Name | City | Hotel Room Sum | Street Name | Number of Rooms |
| --- | --- | --- | --- | --- |
| Driskill | Austin | 58 | Brazos St. | 58 |
| Firehouse Hostel | Austin | 18 | Brazos St. | 18 |
| Hampton Inn | Austin | 49 | San Jacinto St. | 49 |
|  | Dallas | 60 | Commerce St. | 60 |
|  | Houston | 72 | Crawford St. | 72 |
| Hilton | Dallas | 68 | Pacific Ave. | 68 |
| Lancaster | Houston | 62 | Texas Ave. | 62 |
| Magnolia | Dallas | 35 | Commerce St. | 35 |
|  | Houston | 54 | Texas Ave. | 54 |

TABLE 5-continued

| Hotel Name | City | Hotel Room Sum | Street Name | Number of Rooms |
| --- | --- | --- | --- | --- |
| Omni | Austin | 65 | San Jacinto St. | 65 |
| Westin | Dallas | 51 | Main St. | 51 |
|  | Houston | 44 | Texas Ave. | 44 |

As a result of the change to the hierarchical relationship, the Hotel Room Sum column only shows the sum of each hotel based first on the Hotel Name column, and then on the City column. Once again, note that the received calculation for the third column may only reference the Number of Rooms column (the rows to be aggregated), and the association of the third column with the first column (the City column) causes the plurality of rows to be aggregated based on the implicit windowing of the City column, which is now subordinate to the Hotel Name column.

Figure 8:
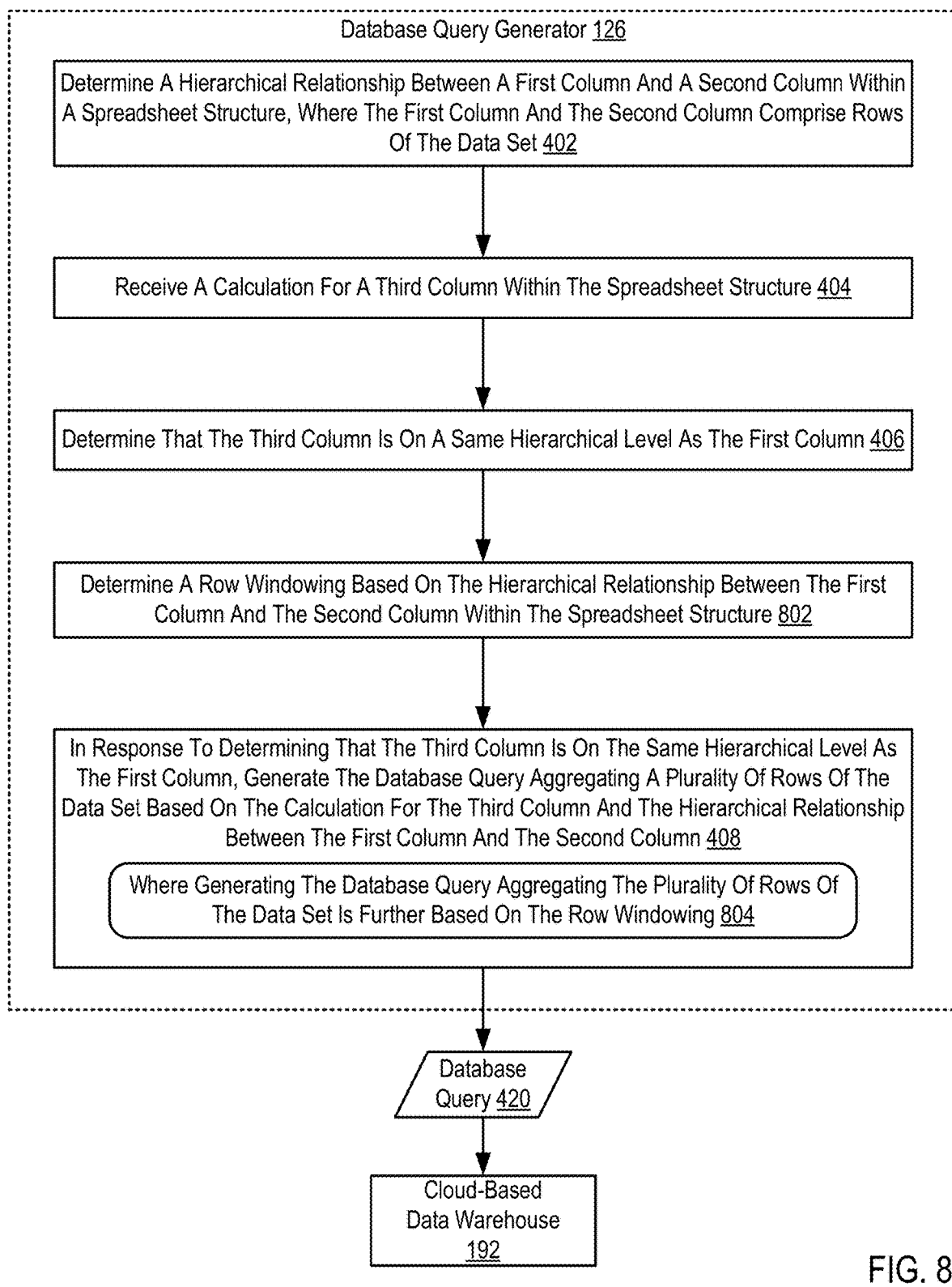
FIG. 8 sets forth a flow chart illustrating an exemplary method for generating a database query to dynamically aggregate rows of a data set according to embodiments of the present invention.

For further explanation, FIG. 8 sets forth a flow chart illustrating a further exemplary method for generating a database query to dynamically aggregate rows of a data set according to embodiments of the present invention that includes determining (402) a hierarchical relationship between a first column and a second column within a spreadsheet structure, wherein the first column and the second column comprise rows of the data set; receiving (404) a calculation for a third column within the spreadsheet structure; determining (406) that the third column is on a same hierarchical level as the first column; and in response to determining that the third column is on the same hierarchical level as the first column, generating (406) the database query (420) aggregating a plurality of rows of the data set based on the calculation for the third column and the hierarchical relationship between the first column and the second column.

The method of FIG. 8 differs from the method of FIG. 4, however, in that the method of FIG. 8 further includes determining (802) a row windowing based on the hierarchical relationship between the first column and the second column within the spreadsheet structure. Determining (802) a row windowing based on the hierarchical relationship between the first column and the second column within the spreadsheet structure may be carried out by the database query generator (126) determining the implicit windowing of the first column. For example, if the first column is the City column, the subordinate columns may be partitioned by city (as in Table 2, Table 3, and Table 4).

Row windowing may also be determined by the function of the third column. The function of the third column may be a windowing function (also referred to as analytical functions). A windowing function is a function that uses a partition of rows in a calculation. There are at least three types of windowing functions—cumulative window functions, moving (or rolling) window functions, and rank windowing functions.

Cumulative window functions calculate a running result within a partition in which each successive row within the partition is incorporated into the calculated result. For example, Table 6 shows a third column that calculates the cumulative percentage of the total number of hotel rooms at the base level and partitioned by city.

TABLE 6

| City | Hotel Name | Street Name | Number of Rooms | Cumulative Percentage |
|---|---|---|---|---|
| Austin | Driskill | Brazos St. | 58 | 31% |
| | Firehouse Hostel | Brazos St. | 18 | 40% |
| | Hampton Inn | San Jacinto St. | 49 | 66% |
| | Omni | San Jacinto St. | 65 | 100% |
| Dallas | Hampton Inn | Commerce St. | 60 | 28% |
| | Hilton | Pacific Ave. | 68 | 60% |
| | Magnolia | Commerce St. | 35 | 76% |
| | Westin | Main St. | 51 | 100% |
| Houston | Hampton Inn | Crawford St. | 72 | 31% |
| | Lancaster | Texas Ave. | 62 | 58% |
| | Magnolia | Texas Ave. | 54 | 81% |
| | Westin | Texas Ave. | 44 | 100% |

Moving window functions calculate a result using a moving group of rows relative to the third column row displaying the result. For example, Table 7 shows a third column that calculates a moving average of number of rooms of the last three rows at the base level and partitioned by city.

TABLE 7

| City | Hotel Name | Street Name | Number of Rooms | Moving Average |
|---|---|---|---|---|
| Austin | Driskill | Brazos St. | 58 | 58 |
| | Firehouse Hostel | Brazos St. | 18 | 38 |
| | Hampton Inn | San Jacinto St. | 49 | 42 |
| | Omni | San Jacinto St. | 65 | 44 |
| Dallas | Hampton Inn | Commerce St. | 60 | 60 |
| | Hilton | Pacific Ave. | 68 | 64 |
| | Magnolia | Commerce St. | 35 | 54 |
| | Westin | Main St. | 51 | 51 |
| Houston | Hampton Inn | Crawford St. | 72 | 72 |
| | Lancaster | Texas Ave. | 62 | 67 |
| | Magnolia | Texas Ave. | 54 | 63 |
| | Westin | Texas Ave. | 44 | 53 |

Rank window functions calculate a rank order of a group of rows. For example, Table 8 shows a third column that calculates a rank of number of greatest number of rooms at the base level and partitioned by city.

TABLE 8

| City | Hotel Name | Street Name | Number of Rooms | City Rank |
|---|---|---|---|---|
| Austin | Driskill | Brazos St. | 58 | 2 |
| | Firehouse Hostel | Brazos St. | 18 | 4 |
| | Hampton Inn | San Jacinto St. | 49 | 3 |
| | Omni | San Jacinto St. | 65 | 1 |
| Dallas | Hampton Inn | Commerce St. | 60 | 2 |
| | Hilton | Pacific Ave. | 68 | 1 |
| | Magnolia | Commerce St. | 35 | 4 |
| | Westin | Main St. | 51 | 3 |
| Houston | Hampton Inn | Crawford St. | 72 | 1 |
| | Lancaster | Texas Ave. | 62 | 2 |
| | Magnolia | Texas Ave. | 54 | 3 |
| | Westin | Texas Ave. | 44 | 4 |

The method of FIG. 8 also differs from the method of FIG. 4 in that generating (406) the database query (420) aggregating a plurality of rows of the data set based on the calculation for the third column and the hierarchical relationship between the first column and the second column further includes wherein (804) generating the database query (420) aggregating the plurality of rows of the data set is further based on the row windowing. Generating the database query (420) aggregating the plurality of rows of the data set based on the row windowing may be carried out by the database query generator (126) selecting a database query statement and populating the statement with parameters using the implicit windowing of the hierarchical relationship and/or the windowing function in the third column calculation. A database query statement may be selected that incorporates the implicit windowing and/or a windowing function.

In view of the explanations set forth above, readers will recognize that the benefits of generating a database query to dynamically aggregate rows of a data set according to embodiments of the present invention include:

In view of the explanations set forth above, readers will recognize that the benefits of generating a database query to dynamically aggregate rows of a data set according to embodiments of the present invention include:

Improving the operation of a computing system by generating complex database queries based on user-friendly selections of data categories, increasing computing system usability and functionality.

Improving the operation of a computing system by presenting complex data sets in a spreadsheet structure, increasing computing system usability and functionality.

Exemplary embodiments of the present invention are described largely in the context of a fully functional computer system for generating a database query to dynamically aggregate rows of a data set. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
   generating a database query to dynamically aggregate rows of a data set, wherein the data set comprises a spreadsheet structure, the spreadsheet structure comprises a first and second column, a hierarchical relationship exists between the first and second column, and each column comprises rows of the data set:
   responsive to receiving a calculation for a third column within the spreadsheet structure, determining that the third column is on a same hierarchical level as the first column; and
   in response to the determining that the third column is on the same hierarchical level as the first column, generating the database query aggregating a plurality of rows of the data set based on the calculation for the third column and the hierarchical relationship between the first column and the second column.

2. The method of claim 1, further comprising:
receiving, in response to the database query, the aggregated plurality of rows of the data set; and
displaying, in the spreadsheet structure, the aggregated plurality of rows of the data set in the third column of the spreadsheet structure.

3. The method of claim 1, further comprising:
determining that the third column has been moved to a same hierarchical level as the second column; and
in response to the determining that the third column has been moved to a same hierarchical level as the second column, generating a subsequent database query aggregating the plurality of rows of the data set based on the calculation for the third column and the hierarchical relationship between the first column and the second column.

4. The method of claim 1, further comprising:
determining a change in the hierarchical relationship between the first column and the second column within the spreadsheet structure; and
in response to the determining the change in the hierarchical relationship between the first column and the second column within the spreadsheet structure, generating a subsequent database query aggregating the plurality of rows of the data set based on the calculation for the third column and the change to the hierarchical relationship between the first column and the second column.

5. The method of claim 1, further comprising:
determining a row windowing based on the hierarchical relationship between the first column and the second column within the spreadsheet structure, and
wherein the generating the database query aggregating the plurality of rows of the data set is further based on the row windowing.

6. The method of claim 1, wherein the determining that the third column is on the same hierarchical level as the first column comprises determining that the third column has been added to a first level in a list structure, wherein the first column has been selected as a key of the first level.

7. The method of claim 1, wherein the database query aggregating a plurality of rows of the data set comprises a structure query language statement.

8. An apparatus comprising a computer processor and a computer memory operatively coupled to the computer processor, the computer memory having disposed within it computer program instructions that, when executed by the computer processor, cause the apparatus to carry out the steps of:
generating a database query to dynamically aggregate rows of a data set, wherein the data set comprises a spreadsheet structure, the spreadsheet structure comprises a first and second column, a hierarchical relationship exists between the first and second column, and each column comprises rows of the data set;
responsive to receiving a calculation for a third column within the spreadsheet structure, determining that the third column is on a same hierarchical level as the first column; and
in response to the determining that the third column is on the same hierarchical level as the first column, generating the database query aggregating a plurality of rows of the data set based on the calculation for the third column and the hierarchical relationship between the first column and the second column.

9. The apparatus of claim 8, wherein the computer program instructions further cause the apparatus to carry out the steps of:
receiving, in response to the database query, the aggregated plurality of rows of the data set; and
displaying, in the spreadsheet structure, the aggregated plurality of rows of the data set in the third column of the spreadsheet structure.

10. The apparatus of claim 8, wherein the computer program instructions further cause the apparatus to carry out the steps of:
determining that the third column has been moved to a same hierarchical level as the second column; and
in response to the determining that the third column has been moved to a same hierarchical level as the second column, generating a subsequent database query aggregating the plurality of rows of the data set based on the calculation for the third column and the hierarchical relationship between the first column and the second column.

11. The apparatus of claim 8, wherein the computer program instructions further cause the apparatus to carry out the steps of:
determining a change in the hierarchical relationship between the first column and the second column within the spreadsheet structure; and
in response to the determining the change in the hierarchical relationship between the first column and the second column within the spreadsheet structure, generating a subsequent database query aggregating the plurality of rows of the data set based on the calculation for the third column and the change to the hierarchical relationship between the first column and the second column.

12. The apparatus of claim 8, wherein the computer program instructions further cause the apparatus to carry out the steps of:
determining a row windowing based on the hierarchical relationship between the first column and the second column within the spreadsheet structure, and
wherein the generating the database query aggregating the plurality of rows of the data set is further based on the row windowing.

13. The apparatus of claim 8, wherein the determining that the third column is on the same hierarchical level as the first column comprises determining that the third column has been added to a first level in a list structure, wherein the first column has been selected as a key of the first level.

14. The apparatus of claim 8, wherein the database query aggregating a plurality of rows of the data set comprises a structure query language statement.

15. A computer program product comprising a non-transitory computer readable medium, that includes computer program instructions that, when executed, cause a computer to carry out the steps of:
generating a database query to dynamically aggregate rows of a data set, wherein the data set comprises a spreadsheet structure, the spreadsheet structure comprises a first and second column, a hierarchical relationship exists between the first and second column, and—each column comprises rows of the data set;
responsive to receiving a calculation for a third column within the spreadsheet structure, determining that the third column is on a same hierarchical level as the first column; and
in response to the determining that the third column is on the same hierarchical level as the first column, generating the database query aggregating a plurality of rows of the data set based on the calculation for the third column and the hierarchical relationship between the first column and the second column.

16. The computer program product of claim 15, wherein the computer program instructions further cause the computer to carry out the steps of:
   receiving, in response to the database query, the aggregated plurality of rows of the data set; and
   displaying, in the spreadsheet structure, the aggregated plurality of rows of the data set in the third column of the spreadsheet structure.

17. The computer program product of claim 15, wherein the computer program instructions further cause the computer to carry out the steps of:
   determining that the third column has been moved to a same hierarchical level as the second column; and
   in response to the determining that the third column has been moved to a same hierarchical level as the second column, generating a subsequent database query aggregating the plurality of rows of the data set based on the calculation for the third column and the hierarchical relationship between the first column and the second column.

18. The computer program product of claim 15, wherein the computer program instructions further cause the computer to carry out the steps of:
   determining a change in the hierarchical relationship between the first column and the second column within the spreadsheet structure; and
   in response to the determining the change in the hierarchical relationship between the first column and the second column within the spreadsheet structure, generating a subsequent database query aggregating the plurality of rows of the data set based on the calculation for the third column and the change to the hierarchical relationship between the first column and the second column.

19. The computer program product of claim 15, wherein the computer program instructions further cause the computer to carry out the steps of:
   determining a row windowing based on the hierarchical relationship between the first column and the second column within the spreadsheet structure, and
   wherein the generating the database query aggregating the plurality of rows of the data set is further based on the row windowing.

20. The computer program product of claim 15, wherein the determining that the third column is on the same hierarchical level as the first column comprises determining that the third column has been added to a first level in a list structure, wherein the first column has been selected as a key of the first level.

* * * * *